Figure 2:
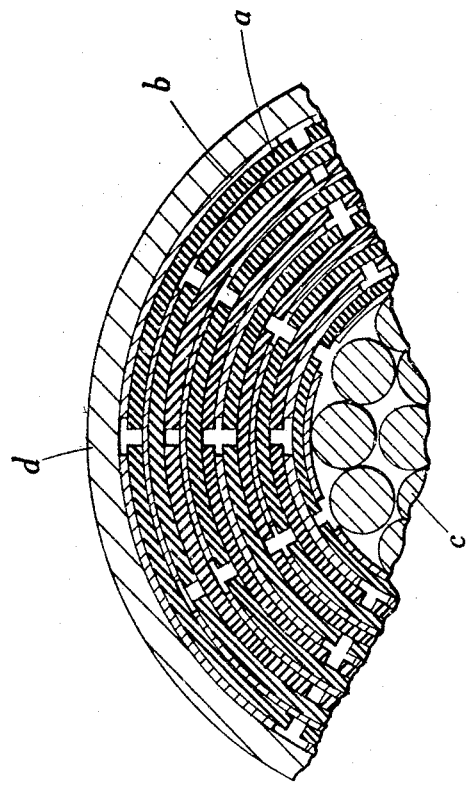

Oct. 28, 1941.    J. URMSTON    2,260,845
ELECTRIC CABLE
Filed Oct. 11, 1939    2 Sheets-Sheet 1

Inventor
James Urmston
by
Stebbins, Blenko & Parnell,
Attorneys.

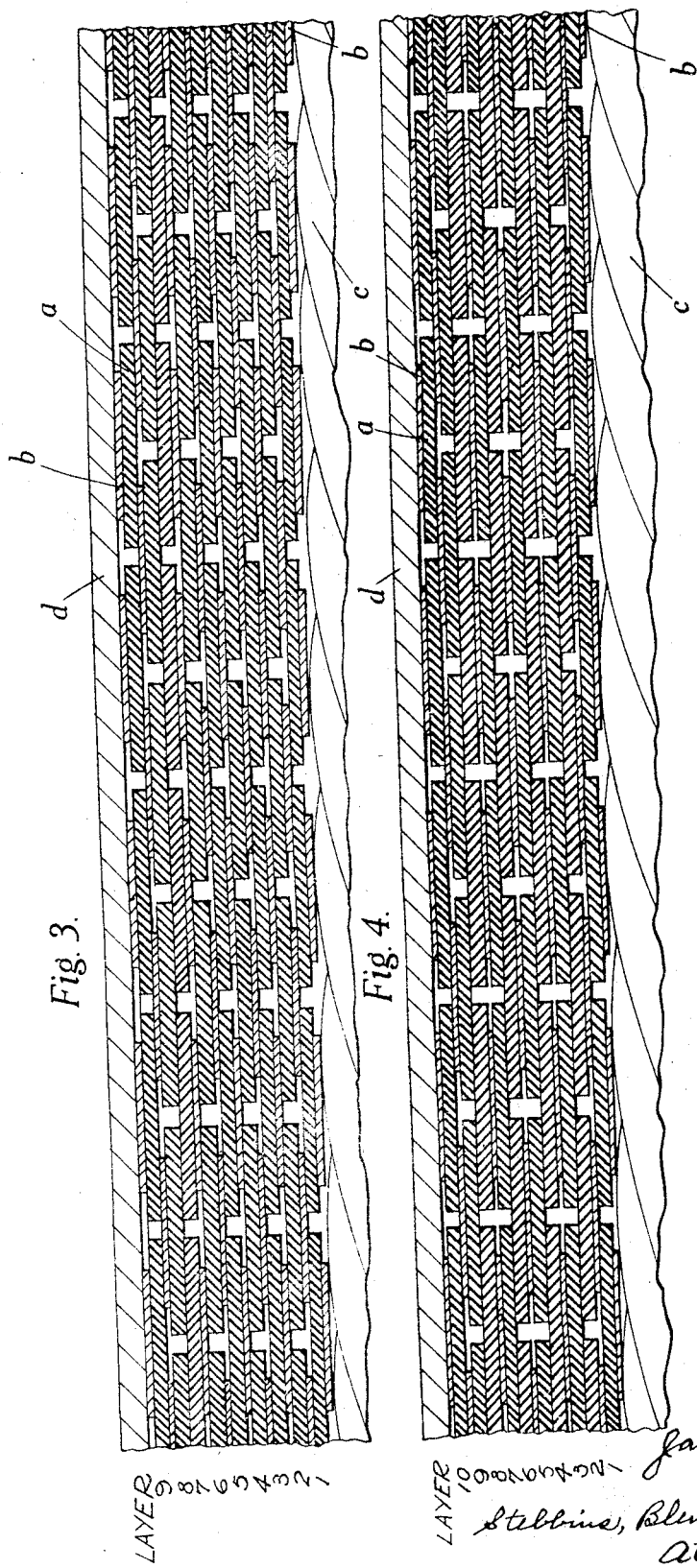

Patented Oct. 28, 1941

2,260,845

UNITED STATES PATENT OFFICE 2,260,845

ELECTRIC CABLE

James Urmston, London, England, assignor to Callender's Cable & Construction Company Limited, London, England, a British company Application October 11, 1939, Serial No. 299,032
In Great Britain October 19, 1938

6 Claims. (Cl. 174—105)

With the object of producing an improved laminated dielectric for a high voltage cable it has been proposed to interleave conducting material with layers of dielectric material, for instance, metal foil interleaved with paper. This would have the effect of filling the region between the conductor and the sheath with concentric cylinders of dielectric material alternating with conducting material, the latter being comparatively closely spaced, being separated, for instance, by the thickness of only one or two layers of paper.

The principal advantage which has been put forward for such a composite arrangement is that, by bringing the conducting layers comparatively close together, the resulting low voltage between them prevents or renders unlikely the ionisation of gas in any so-called "void" spaces which may be formed.

There is, however, a further advantageous condition produced by the proposed arrangement which also tends to the prevention or reduction of ionisation at voids. This is the prevention or minimisation of distortion of the electric field at voids and the corresponding production of electric stress concentration there.

It has, however, been found that the full advantages of this interleaved arrangement cannot be obtained unless a particular disposition of the conducting material in relation to the dielectric is adopted. By the present invention this is made practicable. In accordance with the invention the conducting material is applied in conjunction with a strip of dielectric material, such as paper, in such a way that each strip of conducting material, which is narrower than the strip of dielectric material, is located on the central part of that material so that its edges lie well within the edges of the dielectric strip. This may be done, for instance, by metallising the central part of one side of a strip of paper, leaving clear of metal the region adjacent to each edge of that side.

When composite material of this kind is used in building up the covering of a conductor, the strips can be so arranged that it is impossible for the edge of a conducting strip to be placed in the gaps between turns and layers of dielectric material. These gaps are the places where voids are most likely to be formed.

Experimental evidence indicates that the presence of a conducting body in contact with gas is itself a condition which has a very important influence in assisting ionization. By the present invention this condition is prevented or limited in the extent to which it can take place. The way in which this is done will be made more clear by considering examples which are illustrated diagrammatically in the accompanying drawings, in which—

Figure 1:
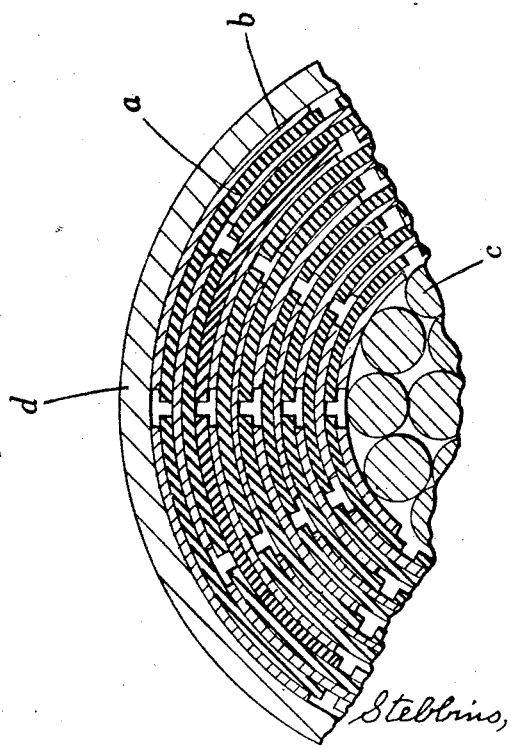

Figures 1 and 2 are transverse sections.

Figures 3 and 4 longitudinal sections of cables showing two arrangements of the composite strips.

Figures 1 and 3 illustrate one arrangement. Figures 2 and 4 illustrate the other. In these figures the thickness of the paper and of the metallic layer thereon are shown greatly exaggerated. The paper is usually a few thousandths of an inch thick; the metal is usually less than one thousandth of an inch in thickness. The paper is indicated by $a$ and the metal layer thereon by $b$ and it will be seen that the layer $b$ is narrower than the strip $a$ and is placed thereon centrally so as to leave an uncovered margin of paper on each side of the part which is covered by the metal.

For convenience of reference the composite layers are numbered at the left hand end of Figure 3 and Figure 4. The number of layers shown is much smaller than would generally be used in practice.

In the first example (Figures 1 and 3) the covering for a conductor is produced by taking paper $a$ metallized on one side to the extent indicated above, and laying this helically round the conductor $c$ with the edges of the turns of a layer close together and with the turns of adjacent layers arranged so as to break joint. This last feature of the arrangement (as shown in Figure 3) is carried out in such a way that the joints between the turns of one layer lie near the centre of the covering turns in the next layer. With this arrangement only one surface of metal is present at each of the spaces between the edges of turns. This is arranged on the radially outer side of the space, the metallization being on the inner side of the paper as shown in the part of the dielectric nearer the conductor $c$ in Figure 3.

The metal part $b$ of the innermost layer (i. e. number 1) is in contact with the conductor $c$ and this layer and the next layer (number 2) perform the function of providing an insulating boundary to the gaps in the third layer. The conductive layers of these two composite layers nearest the conductor can be electrically connected together. The two layers can be replaced by a single layer in which the turns are applied with substantial overlapping. The outermost two layers (numbers 8 and 9) perform the function of providing an insulating boundary to the gaps in the layer underneath them. For this purpose they are applied with the conducting surfaces $b$ outwards. The innermost part of the covering will perform also the function of providing a smooth conductive covering or screen on the outside of the conductor when this itself is not smooth. The outermost part of the covering may perform also the function of a conductive screen in contact with the dielectric and sheath $d$. The invention is not found in these innermost and outermost parts themselves but in the use of the indicated construction in the main part of the dielectric (layers numbers 3 to 7) in conjunction with which these extreme parts are caused to perform additional useful functions.

A further advantage may be obtained by arranging the conducting and dielectric layers so that there is no conductive surface at any of the gaps between turns and layers. This may be done by taking paper, metallised as in the previous example, and applying the strips in pairs with the two metallised surfaces in contact so that the paper surfaces lie outside. By applying turns of such pairs in the manner described for the preceding example (except at the innermost and outermost parts where single strips are used) the result is obtained that all the dielectric regions lie between conducting surfaces spaced a short distance apart while no conducting surface is exposed in the gaps where the production of voids is most likely to occur.

Instead of the double layer of metallisation between the two paper strips as just described, a composite strip may be made up with only one layer of metallisation $b$ between two layers of paper $a$. This, obviously, will produce a dielectric structure of the kind just described. This arrangement is shown in Figures 2 and 4. Here the form of layers 1 and 2 is the same as that of layers 1 and 2 in Figures 1 and 3, and the form of layers 9 and 10 in Figures 2 and 4 is the same as that of layers 8 and 9 of Figures 1 and 3. The middle part of the dielectric (layers 3 to 8) has the alternative form of strip. Here it is convenient to consider two layers of paper $a$ with the intervening layer of metal as a unit. These three layers can conveniently be assembled together before being lapped over the conductor.

A further possible form of composite strip is obtained by folding over the edges of the paper to enclose either the whole or the outer parts of the conductive layer.

It will be seen that the improved form of composite covering for a conductor provides the advantages of the interleaved construction with close spacing of the interleaves and, in addition, reduces the extent to which a conductive layer is exposed at the points where voids may form, or completely prevents such exposure. By this means the possibility of break-down of the cable under operating conditions is made more remote.

The special interleaved construction described may be employed throughout the region between the conductor and the sheath where a potential gradient exists or may be restricted to certain parts thereof, for instance, the part nearer to the conductor, using for the outer part an ordinary laminated dielectric construction. This special interleaved construction can also be employed for the wrapped insulating material of the parts of cables in joints and terminals.

The use of the term "voids" in the preceding description has carried the implication that a cable of the fully impregnated type was under discussion. It will, however, be seen that the nature of the construction renders it applicable to all cases where gas may be present in a cable between turns and layers, whether the presence is accidental or intentional. Accordingly, the invention applies to cables whether fully or partially impregnated, and when gas fills partially or entirely the spaces between turns and layers. The last class includes both the cases of impregnated, coated, or untreated solid dielectric.

What I claim as my invention is:

1. An electric cable, comprising a conductor, a laminated body of material surrounding and insulating said conductor and consisting of overlaid helical strips of insulating and conducting material forming coaxial layers arranged alternately, each conducting strip being isolated from the adjacent conducting strips and the edges of the conducting strips lying between and being shrouded by insulating strips.

2. An electric cable, comprising a conductor, a laminated body of material surrounding and insulating said conductor and consisting of overlaid helical strips of metallized paper forming coaxial layers of insulating and conducting material arranged alternately, each conducting strip being formed by metallization confined to the central region of one side of the paper strip leaving a bare margin of paper at each edge thereof and each said conducting strip being isolated from the adjacent conducting strips.

3. An electric cable comprising a conductor, a laminated body of material surrounding and insulating said conductor and consisting of overlaid composite helical strips, each consisting of two strips of insulating material and a conducting layer between them, the latter being narrower than the dielectric strips and being located in the central part thereof so that both its edges lie between and spaced away from the edges of the insulating strips.

4. An electric cable comprising a conductor, a laminated body of material surrounding and insulating said conductor and consisting of overlaid helical strips forming isolated layers of conducting material interleaved with layers of insulating material, the edges of conducting strips lying between and being shrouded by insulating strips.

5. An electric cable comprising a conductor, a laminated body of material surrounding and insulating said conductor and consisting of overlaid helical strips of insulating and conducting material forming coaxial layers arranged alternately, each conducting layer being on an equipotential surface and comprising a strip of conducting material which is placed centrally on a strip of insulating material which is wider than it, thus leaving a bare margin of insulating material at each side of the conducting strip.

6. An electric cable comprising a conductor, a laminated body of material surrounding and insulating said conductor and consisting of overlaid helical strips of conducting and insulating material forming co-axial insulating and conducting layers arranged alternately, all the turns of the conducting helical strips which lie at the same radial distance from the axis being on one and the same equipotential surface and each conducting strip being placed centrally on a strip of insulating material which is wider than the conducting strip, thus leaving a bare margin of insulating material at each side of the conducting strip.

JAMES URMSTON.